UNITED STATES PATENT OFFICE.

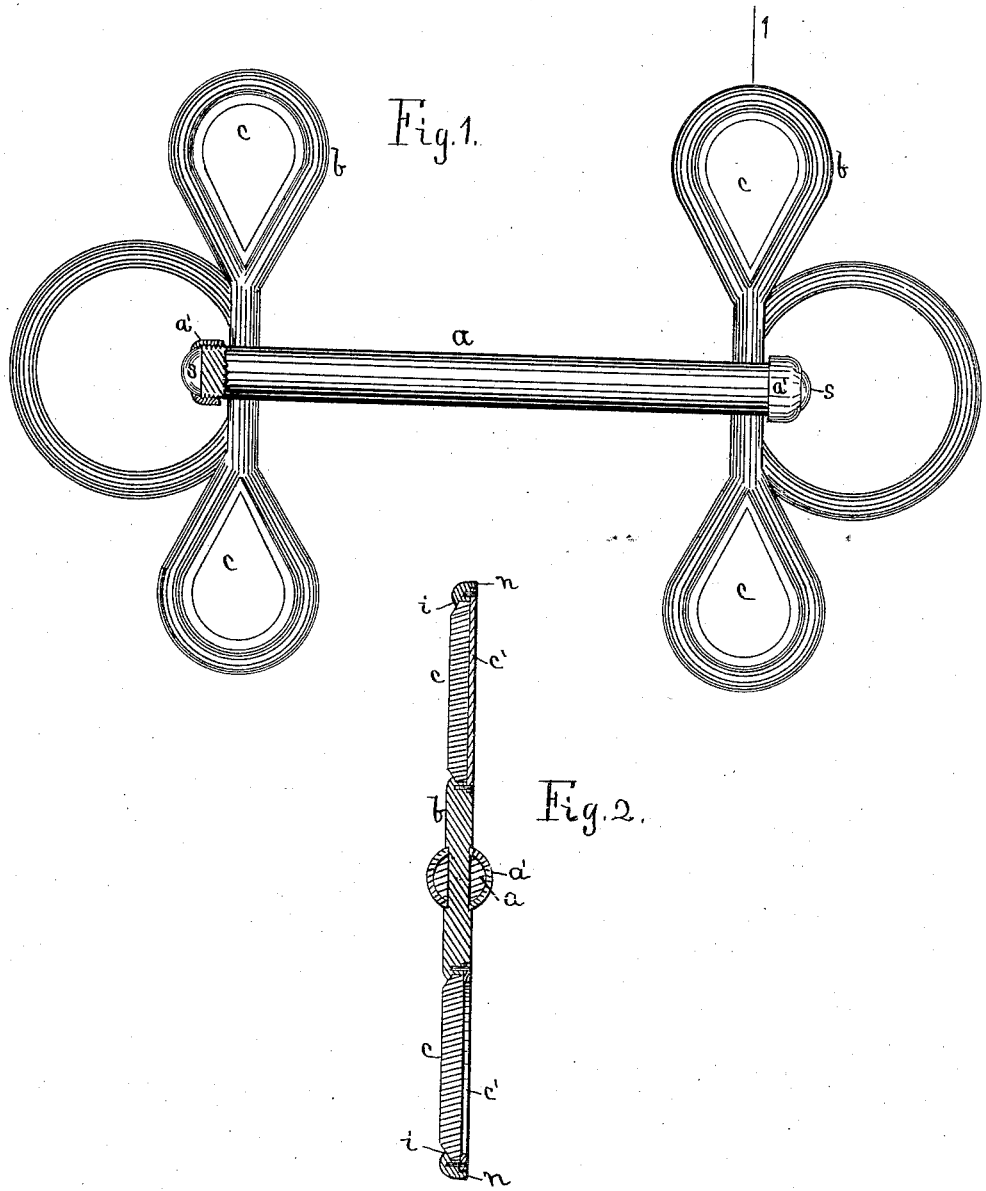

JOHN G. EBERHARD, OF AKRON, OHIO.

BRIDLE-BIT.

SPECIFICATION forming part of Letters Patent No. 324,821, dated August 25, 1885.

Application filed December 15, 1884. (No model.)

*To all whom it may concern:*

Be it known that I, JOHN G. EBERHARD, a citizen of the United States, residing at Akron, in the county of Summit and State of Ohio, have invented a new and useful Improvement in Bridle-Bits, of which the following is a specification.

My invention consists of a bridle-bit formed in part of glass or china.

In the drawings forming a part of this specification, Figure 1 is a view of the bridle-bit with the cap $a'$ at one end of the mouth-piece $a$ in section, and Fig. 2 is a cross-section of the mouth-piece $a$ and cheek $b$ at line 1 in Fig. 1.

The ends of cheeks $b$ are formed with openings, which may be of any desirable shape, to receive and retain the glass pieces $c$.

For the purpose of retaining the glass $c$ in place, the cheeks are formed with slight flanges $i$ on their faces, and recesses $n$ on the opposite side, in which are riveted pieces of sheet metal $c'$, that either wholly or partially cover the glass on that side.

In Fig. 2 the upper retaining-piece $c'$ wholly covers the glass $c$, and the lower piece $c'$ is represented as a narrow ring only partially covering glass $c$, but sufficiently to retain the latter in place. Any other well-known means may be used for the purpose. The ends of the mouth-piece $a$ are each provided with a glass piece, $s$, held in place by a metallic cap, $a'$, which is threaded and screwed on the screw-threaded end of the mouth-piece. The outer end of cap $a'$ is slightly flanged inwardly to retain the glass.

The bridle-bits herein described, formed in part of glass or china, present an improved appearance, and the glass portions are not liable to be tarnished, and are easily cleaned.

I claim as my invention—

1. As an article of manufacture, a bridle-bit formed in part of glass or china, the bit having cheeks $b$, formed with flanges $i$, and provided with retaining-pieces $c'$ and glass or china $c$, substantially as herein described.

2. In a bridle-bit, the combination of mouth-piece $a$, glass or china piece $s$, and cap $a'$, attached to the end of the mouth-piece and partly inclosing piece $s$, to retain the same in place, substantially as described.

JOHN G. EBERHARD.

Witnesses:
W. W. WARNER,
FRANK SCHAFFER.